(12) United States Patent
Cook et al.

(10) Patent No.: US 9,700,791 B2
(45) Date of Patent: Jul. 11, 2017

(54) OVERLAYING INTERACTIVE VIDEO GAME PLAY WITH REAL-TIME CHAT SESSIONS WITH GAME SWITCHING

(75) Inventors: John Cook, Seattle, WA (US); Martin Otten, Seattle, WA (US)

(73) Assignee: VALVE CORPORATION, Bellevue, WA (US)

( * ) Notice: Subject to any disclaimer, the term of this patent is extended or adjusted under 35 U.S.C. 154(b) by 1834 days.

(21) Appl. No.: 12/191,794

(22) Filed: Aug. 14, 2008

(65) Prior Publication Data
US 2010/0041457 A1 Feb. 18, 2010

(51) Int. Cl.
*A63F 13/533* (2014.01)
*A63F 13/87* (2014.01)
*A63F 13/30* (2014.01)
*H04L 12/58* (2006.01)
*H04L 12/18* (2006.01)

(52) U.S. Cl.
CPC ........... *A63F 13/533* (2014.09); *A63F 13/12* (2013.01); *A63F 13/87* (2014.09); *H04L 12/1827* (2013.01); *H04L 12/581* (2013.01); *H04L 51/04* (2013.01); *A63F 2300/308* (2013.01); *A63F 2300/535* (2013.01); *A63F 2300/572* (2013.01)

(58) Field of Classification Search
USPC ....... 709/203, 204, 219, 217, 229, 201, 223, 709/227; 463/16-40
See application file for complete search history.

(56) References Cited

U.S. PATENT DOCUMENTS

| | | | |
|---|---|---|---|
| 5,771,353 A | 6/1998 | Eggleston et al. | |
| 6,009,458 A | 12/1999 | Hawkins et al. | |
| 6,141,698 A * | 10/2000 | Krishnan | G06F 9/44521 719/331 |
| 6,463,583 B1 * | 10/2002 | Hammond | G06F 9/44521 714/E11.207 |
| 6,466,969 B1 | 10/2002 | Bunney et al. | |
| 6,699,125 B2 | 3/2004 | Kirmse et al. | |
| 6,769,989 B2 | 8/2004 | Smith et al. | |
| 6,893,347 B1 | 5/2005 | Zilliacus et al. | |
| 6,908,389 B1 | 6/2005 | Puskala | |
| 7,043,530 B2 | 5/2006 | Isaacs et al. | |
| 7,056,217 B1 | 6/2006 | Pelkey et al. | |
| 7,133,368 B2 | 11/2006 | Zhang et al. | |
| 7,240,093 B1 * | 7/2007 | Danieli et al. | 709/205 |
| 7,288,028 B2 | 10/2007 | Rodriquez et al. | |
| 7,376,621 B1 | 5/2008 | Ling | |
| 7,418,663 B2 | 8/2008 | Pettinati et al. | |
| 7,517,282 B1 | 4/2009 | Pryor | |

(Continued)

*Primary Examiner* — Nicholas Taylor
*Assistant Examiner* — Chong G Kim
(74) *Attorney, Agent, or Firm* — Haug Partners LLP

(57) ABSTRACT

Embodiments are directed towards providing an interactive game experience whereby a game player may combine game play with a user interface overlaid onto the game that is useable to interact and communicate with other players inside and/or outside of the current game. Through the use of the user interface, a player may select different game sets to play, and rapidly switch between games with different players, while maintaining a real-time interactive chat session, or similar communication session, including, without limit, voice communication sessions. A game client component may launch a game, and then hooks into the game to intercept various input and video functions.

18 Claims, 7 Drawing Sheets

(56) References Cited

U.S. PATENT DOCUMENTS

| | | | |
|---|---|---|---|
| 7,837,561 B2* | 11/2010 | Bortnik et al. | 463/40 |
| 2002/0086732 A1* | 7/2002 | Kirmse et al. | 463/42 |
| 2004/0128250 A1 | 7/2004 | Fox et al. | |
| 2004/0128252 A1 | 7/2004 | Shirai et al. | |
| 2004/0224772 A1* | 11/2004 | Canessa et al. | 463/42 |
| 2004/0235567 A1 | 11/2004 | Chatani | |
| 2005/0080898 A1* | 4/2005 | Block | G06F 17/30867 709/225 |
| 2005/0091164 A1 | 4/2005 | Varble | |
| 2005/0097007 A1 | 5/2005 | Alger et al. | |
| 2005/0273439 A1 | 12/2005 | Yen et al. | |
| 2005/0286519 A1 | 12/2005 | Ravikumar et al. | |
| 2006/0025216 A1 | 2/2006 | Smith | |
| 2006/0036549 A1 | 2/2006 | Wu | |
| 2006/0041848 A1* | 2/2006 | Lira | 715/805 |
| 2006/0136584 A1 | 6/2006 | Decker et al. | |
| 2006/0178216 A1 | 8/2006 | Shea et al. | |
| 2006/0287096 A1* | 12/2006 | O'Kelley et al. | 463/42 |
| 2007/0155506 A1* | 7/2007 | Malik | 463/42 |
| 2007/0165629 A1 | 7/2007 | Chaturvedi et al. | |
| 2007/0243934 A1* | 10/2007 | Little et al. | 463/40 |
| 2008/0125226 A1 | 5/2008 | Emmerson | |
| 2008/0207328 A1* | 8/2008 | Slough | G06Q 30/02 463/42 |
| 2008/0222618 A1* | 9/2008 | Valtchev | G06F 9/4443 717/139 |
| 2009/0178061 A1* | 7/2009 | Sandoval | G06F 9/54 719/328 |
| 2009/0253516 A1* | 10/2009 | Hartmann et al. | 463/42 |
| 2010/0024036 A1* | 1/2010 | Morozov | G06F 21/53 726/26 |

\* cited by examiner

OVERLAYING INTERACTIVE VIDEO GAME PLAY WITH REAL-TIME CHAT SESSIONS WITH GAME SWITCHING

FIELD OF THE INVENTION

The present invention relates generally to computer applications and more particularly, but not exclusively, to enabling video garners to overlay a real-time chat, or other messaging, session onto an interactive video game session and to further enable game switching.

BACKGROUND OF THE INVENTION

Today, the computer gaming industry is a multi-billion dollar industry. Such popularity may be due in part to faster computing devices, higher quality graphics, and better quality games. Moreover, the popularity of many online multi-player games may also be due to the availability of cost-effective broadband Internet access by the game players. With higher bandwidth, and lower latency than dial-up services, more players are able to join online games.

While technology improvements can be attributed at least in part to the popularity of online games, it is also likely that many players may participate in online game activities for the social aspect of the games. That is, online games provide a game player with an opportunity to interact with other game players and share experiences. Therefore, many online game players may desire more opportunities, in the online game, to interact and share their experiences with other game players and/or potential game players. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings wherein.

DETAILED DESCRIPTION OF THE INVENTION

Figure 1:
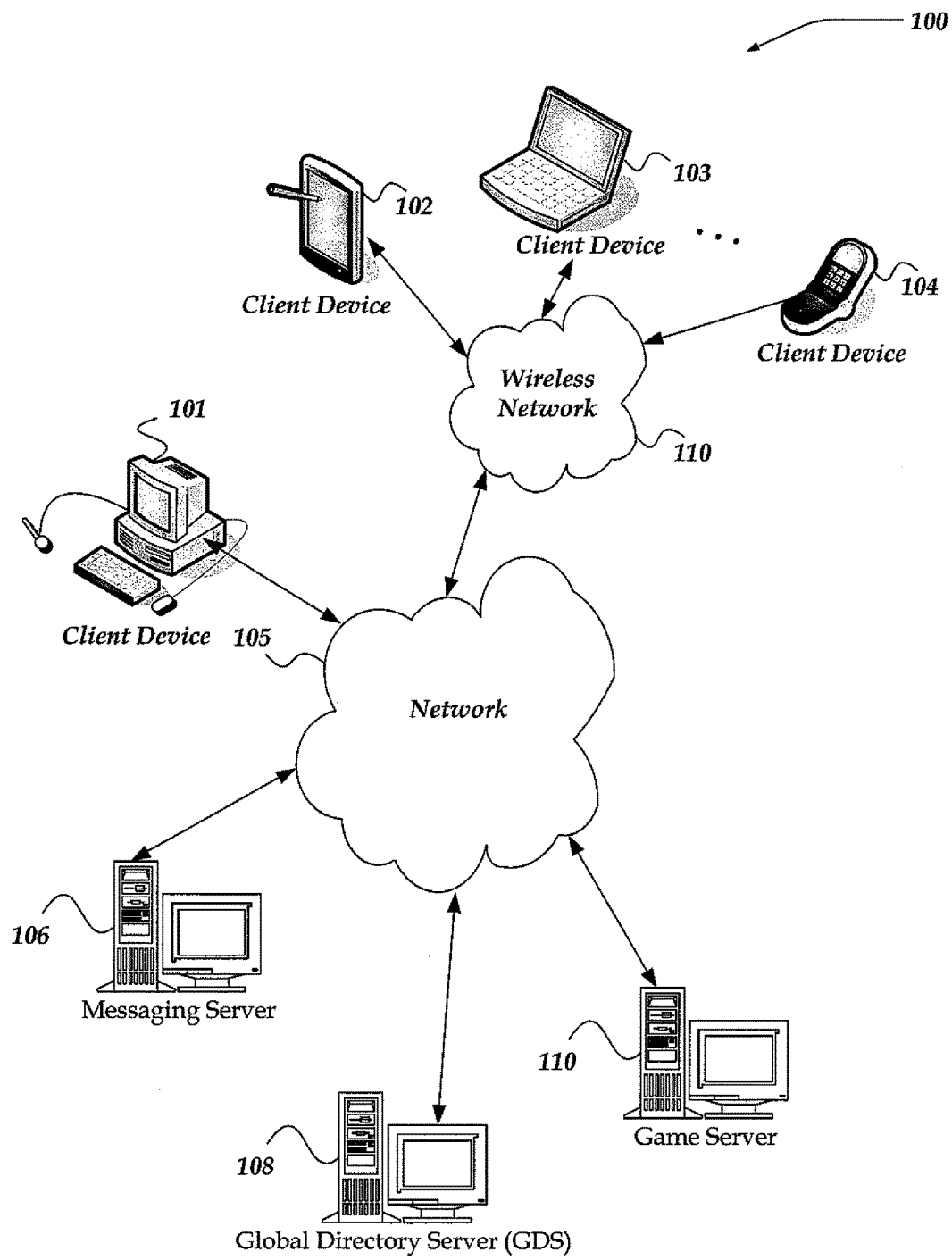
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards providing an interactive game experience whereby a game player may combine game play with a user interface overlaid onto the game that is useable to interact and communicate with other players inside and/or outside of the current game. Through the use of the user interface, a player may select different game sets to play, and switch between games with different players, while maintaining a real-time interactive chat session, or similar messaging session, including, without limit, voice sessions.

A game client component is configured to maintain and display real-time presence information about other players that may be online, allowing a player to see which games the other players may be playing, and allow the player to establish various messaging sessions, or the like, with the other players. The game client component may launch a game selected by the player, and then establish a hook into the launched game using an overlay technology described below. The hook enables management of a full screen game play, while displaying the messaging session user interface. In one embodiment, various inputs and/or outputs are hooked to the game overlay for analysis. Input or output determined to be associated with the messaging session may be diverted and/or otherwise modified to enable the messaging session. For example, if an input is determined to be a keyboard entry associated with a message from a user, the keyboard entry may be diverted from a game engine to a message manager.

In one embodiment, the game overlay may establish inter-process communications (IPC) between the game client component and the game engine. Through the IPC messaging, data may be sent to and/or received from the messaging session. Moreover, state information, including history information about a messaging session may be maintained at the client device.

Illustrative Operating Environment

FIG. 1 illustrates a block diagram generally showing an overview of one embodiment of a system in which the present invention may be practiced. System 100 may include many more components than those shown in FIG. 1. However, the components shown are sufficient to disclose an illustrative embodiment for practicing the present invention. As shown in the figure, system 100 includes local area networks ("LANs")/wide area networks ("WANs")—(network) 105, wireless network 110, client devices 101-104, messaging server 106, game server 110, and Global Directory Server (GDS) 108.

One embodiment of a client device usable as one of client devices 101-104 is described in more detail below in conjunction with FIG. 2. Briefly, however, client devices 102-104 may include virtually any mobile computing device capable of receiving and sending a message over a network, such as network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, components to a computer application, such as a video game, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed. Thus, in one embodiment, client devices 101-104 may enable users to participate in one or more messaging sessions, such as a chat session. Such messaging sessions may be text oriented, in that the communications are achieved using text. However, other messaging sessions may occur using client devices 101-104 that employ other mechanisms to communicate, include, but not limited to audio, graphics, video, and/or a combination of text, audio, graphics, and/or video.

Client devices 101-104 may further be configured to enable a user to request and/or otherwise obtain various computer applications, including, but not limited to video games. In one embodiment, the computer application may be obtained via a portable storage device such as a CD-ROM, a digital versatile disk (DVD), optical storage device, magnetic cassette, magnetic tape, magnetic disk storage, or the like. However, in another embodiment, client devices 101-104 may be enabled to request and/or otherwise obtain various computer applications over a network, such as from game server 110, or the like. It should be noted that while, some embodiments are directed towards computer applications and the invention is not so limited. Thus, in another embodiment, the request and access may be made to any of a variety of digital executable content, including, but not limited to motion pictures, movies, videos, music, interactive media, audios, or the like.

Thus, for example, a user of client devices 101-104 might request and receive a computer game application, such as an online multi-player computer game, or the like. In one embodiment, the user may have the computer game execute a client management component on one of client devices 101-104 that may then be employed to communicate over network 105 with game server 110, and/or other client devices, to enable the multi-player gaming experience. As described further below, in one embodiment, the user may participate in an online computer game while an overlaid messaging session user interface window is concurrently displayed to enable interaction with other game players both inside and outside of the current computer game. Using the messaging session user interface, the user may select different computer games to play and/or rapidly switch between games with different players, while maintaining a substantially real-time messaging session as active.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDM), Bluetooth, or the like. In essence, wireless network 110 may include virtually any wireless communication mechanism by which information may travel between client devices 102-104 and another computing device, network, or the like.

Network 105 is configured to couple messaging server 106, GDS 108, game server 110, and client device 101 with other computing devices, including potentially through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

GDS 108 is configured to provide location information about game 110, and the like, to client devices 101-104. GDS 108 may also receive location information from game server 110, and the like. In one embodiment, the location information includes an IP address. Location information may also include a Universal Resource Locator (URL), Media Access Control (MAC) address, and the like. In one embodiment, client devices 101-104 may communicate with GDS 108 to obtain location information for game server 110 or the like.

One embodiment of game server 110 is described in more detail below in conjunction with FIG. 3. Briefly, however, game server 110 may include any computing device capable of connecting to network 105 to manage delivery of components of an application, such as a game application, or virtually any other digital content. In addition, game server 110 may also be configured to enable an end-user, such as an end-user of client devices 101-104, to selectively access, install, and/or execute the application.

Game server 110 may further enable a user to participate in one or more online games, such as multi-player games. Moreover, game server 110 might interact with messaging server 106 to enable a user of client devices 101-104 to participate in a messaging session overlaid onto a game display. Game server 110 might receive a registration of a user, and/or send the user a list of users and current presence information, such as a user name (or alias), an online/offline status, whether a user is in a game, which game a user is currently playing online, or the like, to client devices 101-104. In at least one embodiment, game server 110 might employ various messaging protocols to provide such information to a user. In one embodiment, game server 110 might further provide at least some of the information through a messaging session to one or more users.

Messaging server 106 includes virtually any network computing device that is configured to manage messages received over a network. In one embodiment, messaging server 106 may include a message server that is configured to receive messages and route them to an appropriate client device, or the like. Thus, messaging server 106 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, and the like. However, messaging server 106 may also include a message server configured and arranged to manage other types of messages, including, but not limited to SMS, MMS, IM, Voice Over IP (VOIP), or the like. In one embodiment, messaging server 106 may be configured to manage messaging sessions between one or more users.

Devices that may operate as messaging server 106, game server 110, and/or GDS 108 include personal computers, desktop computers, multiprocessor systems, microprocessor-based or programmable consumer electronics, network PCs, servers, and the like.

Moreover, although messaging server 106, game server 110, and GDS 108 are described as distinct servers, the invention is not so limited. For example, one or more of the functions associated with these servers may be implemented in a single server, distributed across a peer-to-peer system structure, or the like, without departing from the scope or spirit of the invention. Thus, as described below in conjunction with FIG. 3, is a network device 300 configured to manage messaging sessions and game play. However, other configurations are also envisaged. Therefore, the invention is not constrained or otherwise limited by the configurations shown in FIGS. 1-4.

Illustrative Client Device

Figure 2:
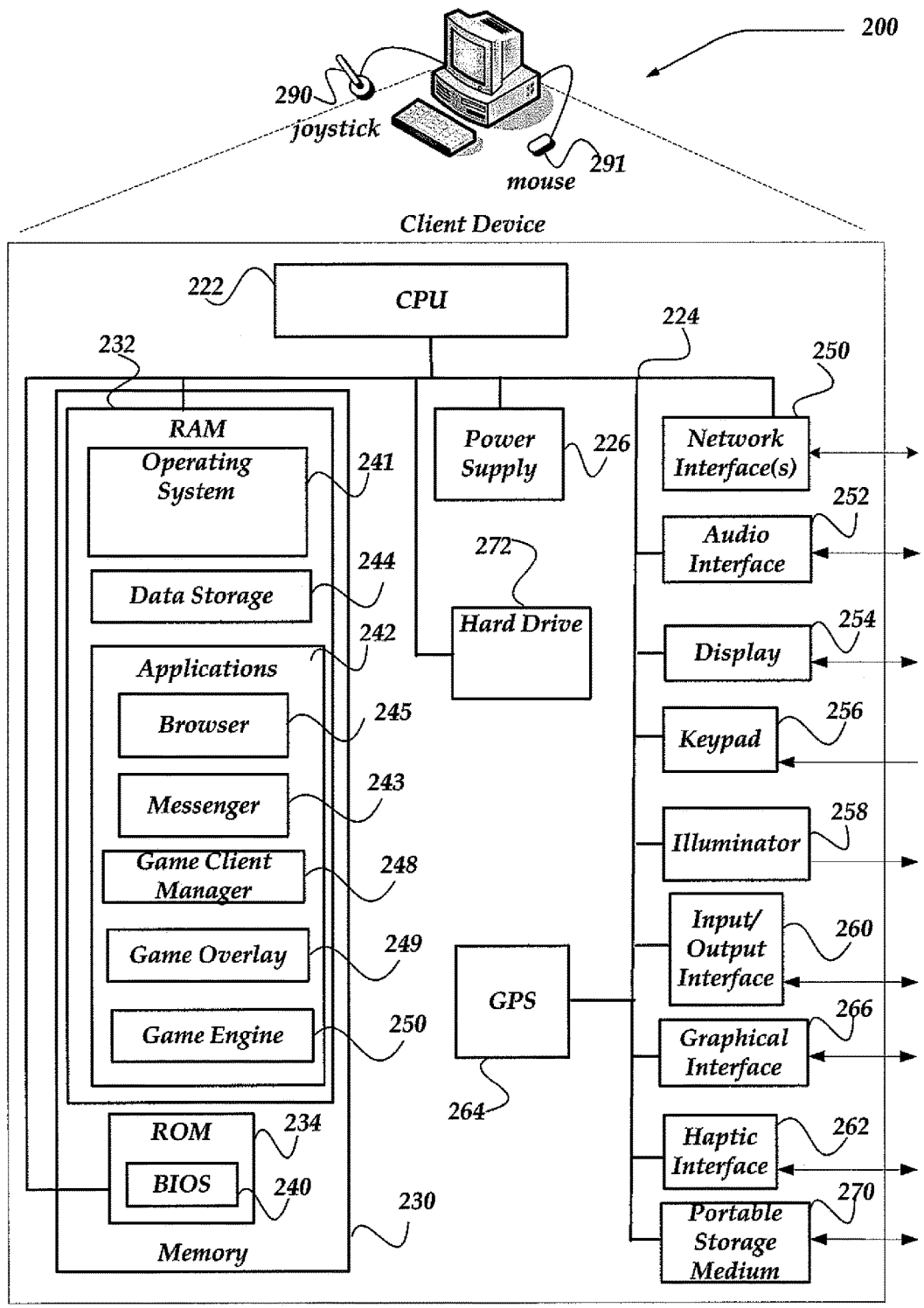
FIG. 2 shows one embodiment of a client device for use in the environment of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252 that may be configured to receive an audio input as well as to provide an audio output, a display 254, a keypad 256, an illuminator 258, an input/output interface 260, a haptic interface 262, and a global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery. Client device 200 may also include a graphical interface 266 that may be configured to receive a graphical input, such as through a camera, scanner, or the like.

Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images, game play, messaging sessions, or the like. In one embodiment, a computer game may have one or more keystroke combinations associated with a particular activity within a game. In one non-limiting non-exhaustive example, a CTL-Q might be interpreted to be a computer game input for quitting the game, while some other combination might be interpreted as moving an avatar, picking up an object, selecting game play options, or the like.

Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices, including, but not limited, to joystick 290, mouse 291, or the like. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may, through other components, provide other information that may be employed to determine a geo physical location of the device, including for example, a MAC address, IP address, or other network address.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications and/or other data. For example, data storage 244 may also be employed to store information that describes various capabilities of client device 200, a device identifier, and the like. The information may then be provided to another device based on any of a variety of events, including being sent as part of a header during a communication, sent upon request, or the like.

In one embodiment, data storage 244 may also include cookies, portions of a computer application, user preferences, game play data, messaging data, and/or other digital content, and the like. At least a portion of the stored data may also be stored on an optional hard disk drive 272, optional portable storage medium 270, or other storage medium (not shown) within client device 200.

Applications 242 may include computer executable instructions which, when executed by client device 200, transmit, receive, and/or otherwise process messages (e.g., SMS, MMS, IMS. IM, email, and/or other messages), audio, video, and enable telecommunication with another user of another client device. Other examples of application programs include calendars, browsers, email clients, IM applications, VOIP applications, contact managers, task managers, database programs, word processing programs, security applications, spreadsheet programs, search programs, and so forth. Applications 242 may further include browser 245, messenger 243, game client manager 248, game overlay 249, and game engine 250.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, VOIP, or the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols. Moreover, messenger 243 might be configured to manage a plurality of messaging sessions concurrently, enabling a user to communicate with a plurality of different other users in different messaging sessions, and/or a same messaging session. As used herein, the term "active messaging session" refers to a messaging session in which a user may communicate with another user independent of having to restart and/or re-establish the messaging session. Thus, maintaining a messaging session as active indicates that the messaging session is established, and has not been terminated, or otherwise, placed into a sleep mode, or other inactive mode, whereby messages may not be actively sent and/or received.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed.

Game client manager 248 represents a game application component that is configured to enable a user to select one or more games to play, register for access to the one or more games, and/or launch the one or more games for online interactive play. In one embodiment, game client manager 248 may establish communications over a network with a network device, such as game server 110, or the like, to enable registration, purchase, access to, and/or play of the one or more computer games.

Game client manager 248 may receive from a user via various user input devices, including, but not limited to those mentioned above, directions to launch a computer game, such as game engine 250, or the like. Game client manager 248 may then enable communications of game data between client device 200 and the game server 110, another client device, or the like.

Game client manager 248 may also receive and maintain for display real-time presence information about other users which may or may not be participating in online games. Thus, game client manager 248 might receive such presence information that includes, but is not limited to information about which users are playing an online game, which online game they are playing, and/or other information that may be useable to communicate with and/or play multi-player online computer games with other users.

Game client manager 248 may also receive and/or otherwise enable communications of messaging session data for use in enabling one or more active messaging sessions that may be overlaid onto a display of a game play.

Game client manager 248 may launch a computer game, such as game engine 250, and hook into the game. In one embodiment, a hook into the game may be achieved by identifying any input and/or output functions, libraries, including but not limited to dynamic link libraries (DLLs), or the like, that the computer game might employ for use in receiving user inputs and/or providing outputs to a user, and/or another user. When such components are identified, game client manager 248 might, in one embodiment, dynamically modify the component by injecting code that is configured to perform a jump to another component before the input/output component is executed, and/or a jump after the input/output component is executed. In one embodiment, data associated with the input/output component might also be provided along with the jump action. However, in another embodiment, game client manager 248 might replace the identified input and/or output components with another component that might include a hook (or jump) to the other component. In one embodiment, the other component is game overlay 249.

In one embodiment, the process of identifying and injecting the hooks might be performed by launching game engine 250 for load and execution, pausing the load and execution process, employing the pause to inject the hooks, and then enabling the load and/or execution of game engine 250 to proceed.

The hooked input and/or output components enable monitoring of user inputs that may be directed towards a messaging session such as managed by messenger 243, or towards game engine 250. Thus, for example, various user device inputs might be monitored, including but not limited to keyboard 256, audio interface 252, joystick 290, mouse 291, and/or other device inputs that may be received through input/output interface 260, or the like. Similarly, the hooked output components might include but are not limited to those output components configured to provide a display to a screen associated with client device 200, an audio output, or the like. In one embodiment, such output components may include but are not limited to DirectX, OpenGL libraries, or the like.

Game client manager 248 may her be configured to launch for execution game overlay 249 for use in managing a determination whether an input and/or output is associated with a messaging session, or game play. Game overlay 249 may further manage rendering of various messaging session user interface components, including a display window, overlaid onto a game display. One non-limiting, non-exhaustive example of such overlay is described in more detail below in conjunction with FIG. 7.

Game overlay 249 may also retrieve from game client manager 248 and/or a messaging session, presence information, such as a friends' list, or the like, and/or other presence information as noted above. Game overlay 249 may further receive active messaging session information from messenger 243 and/or game client manager 248. In one embodiment, game overlay 249, game client manager 248, and game engine 250 may communicate such information using an inter-process communications (IPC). Such IPCs may include, but are not limited to message passing, synchronization, shared memory, remote procedure calls (RPC), or the like. Other mechanisms may also be employed, including, for example, sockets, Dynamic Data Exchange (DDE), named pipes, DCOM2, or the like. Thus, the invention is not constrained to any particular mechanism for enabling inter-component communications within client device 200. In any event, game overlay 249 may receive such active messaging session information and enable it to be displayed in a messaging session user interface window overlaid onto a game display.

Furthermore, game overlay 249 might receive information about another user starting a computer game on a remote client device. Game overlay 249 may, in one embodiment, then enable a display of a pop-up notification, or other form of notification on top of the game display on client device 200 to indicate that the other user has started the computer game. In one embodiment, using the user interface that game overlay 249 provides as an overlay, a user of client device 200 might receive an invite to join the computer game of the other user. The user of client device 200 may then select to join the other computer game of the other user through a friends' list, and/or via a link within the messaging session. In any event, in one embodiment, if the user of client device 200 selects to join the other user's computer game, the join request from the user may be sent to game client manager 248 through game overlay 249. Game client manager 248 may then employ the received join request information to enable the user of client device 200 to switch from a current game, to another game (that which the other user is currently playing), while maintaining the messaging session as active during the switch.

Game engine 250 represents a computer game application; however, game client 248 is not limited to game applications, and may also represent virtually any interactive computer application, or other interactive digital content. In any event, game engine 250 represents a client component useable to one enable online multi-user game play. Non-exhaustive, non-limiting examples of such computer games include but are not limited to Half-Life, Team Fortress, Portal, Counter-Strike, and Day of Defeat developed by Valve Corporation of Bellevue, Wash.

Illustrative Network Device

Figure 3:
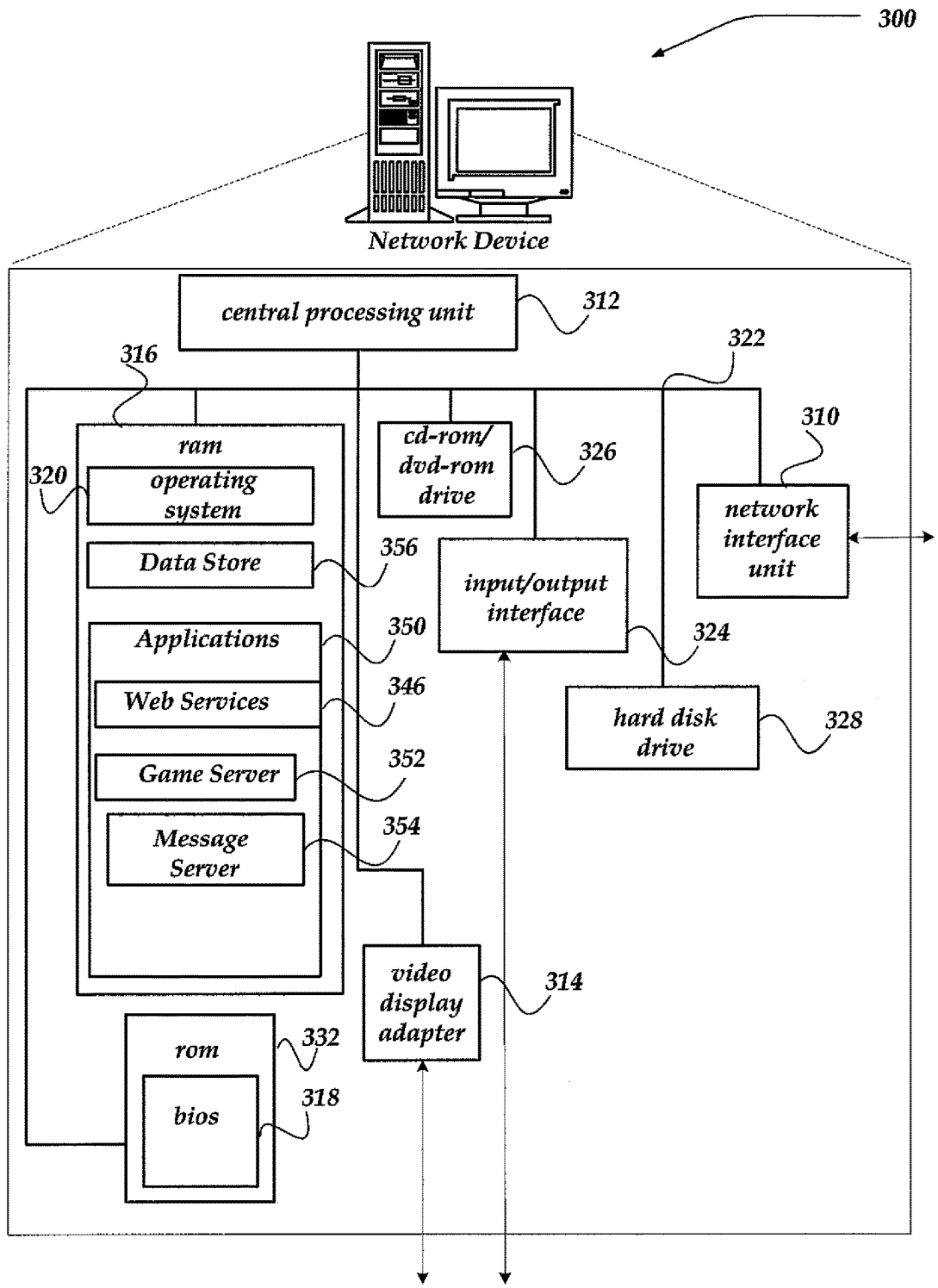
FIG. 3 shows one embodiment of a network device for use in managing distribution of an application configured to use hidden secrets for anti-piracy.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, game server 110 in combination with messaging server 106 of FIG. 1

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, and removable storage device 326 that may represent a tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol, Wi-Fi, Zigbee, WCDMA, HSDPA, Bluetooth, WEDGE, EDGE, UMTS, or the like. Network interface unit 310 is sometimes known as a transceiver, transceiving device, or network interface card (NIC).

The mass memory as described above illustrates another type of computer-readable media, namely computer storage media. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Applications 350 may also include web services 346, game server 352, and Game Authentication Manger (GAM) 354.

Web services 346 represent any of a variety of services that are configured to provide content over a network to another computing device. Thus, web services 346 include for example, a web server, messaging server, a File Transfer Protocol (FTP) server, a database server, a content server, or the like. Web services 346 may provide the content over the network using any of a variety of formats, including, but not limited to WAP, HDML, WML, SMGL, HTML, XML, cHTML, xHTML, or the like.

Message server 354 may include virtually any computing component or components configured and arranged to manage messages from message user agents, and/or other message servers, or to deliver messages to a message application, one another network device. Message server 354 is not limited to a particular type of messaging. Thus, message server 354 may provide capability for such messaging services, including, but not limited to email, SMS, MMS, IM, IRC, mIRC, Jabber, VOIP, and/or a combination of one or more messaging services.

Data stores 360 includes virtually any component that is configured and arranged to store data including, but not limited to user preference data, log-in data, user authentication data, game data, and the like. Data store 360 also includes virtually any component that is configured and arranged to store and manage digital content, such as computer applications, video games, and the like. As such, data stores 360 may be implemented using a data base, a file, directory, or the like.

Game server 352 is configured to manage delivery of content, including components of the application, to a client device, such as clients 101-104 of FIG. 1. Typically game server 352 may provide components to an application, such as a game application to the client device over a network. At least one of the components provided is encrypted using any of a variety of encryption mechanisms. For example, in one embodiment of the invention, Crypto++, an open-source class library of cryptographic techniques, is employed in encrypting or decrypting components of the application. However, virtually any other encryption and decryption mechanism, including open source, commercial, and/or proprietary may be used, including Advanced Encryption Standard (AES), RSA Labs Inc.'s (hereinafter "RSA's") RC6, IBM's MARS, TwoFish, Serpent, CAST-256, International Data Encryption Algorithm (IDEA), Data Encryption Standard (DES), Triple DES, DES-EDE2, DES-EDE3, DESX, DES-XEX3, RC2, RC5, Blowfish, Diamon2, TEA, SAFER, 3-WAY, GOST, SHARK, CAST-128, Square, Skipjack, Panama, ARC4, SEAL, WAKE, Sapphire II, BlumBlum-Shub, RSA, DSA, ElGamal, Nyberg-Rueppel (NR), Blum- Goldwasser, Rabin, Rabin-Williams (RW), LUC, LUCELG, ECDSA, ECNR, ECIES, ECDHC, ECMQVC, and the like.

Game server 352 may further receive and/or authenticate a request from a client device for access to an application. Game server 352 may provide for purchase of an application, such as a computer game, enable registration for play of the application, and/or enable download access for the application.

Game server 352 may further enable communications between client devices participating in a multi-player application by receiving and/or providing various data, messages, or the like, between the client devices.

An Illustrative Game Architecture

Figure 4:
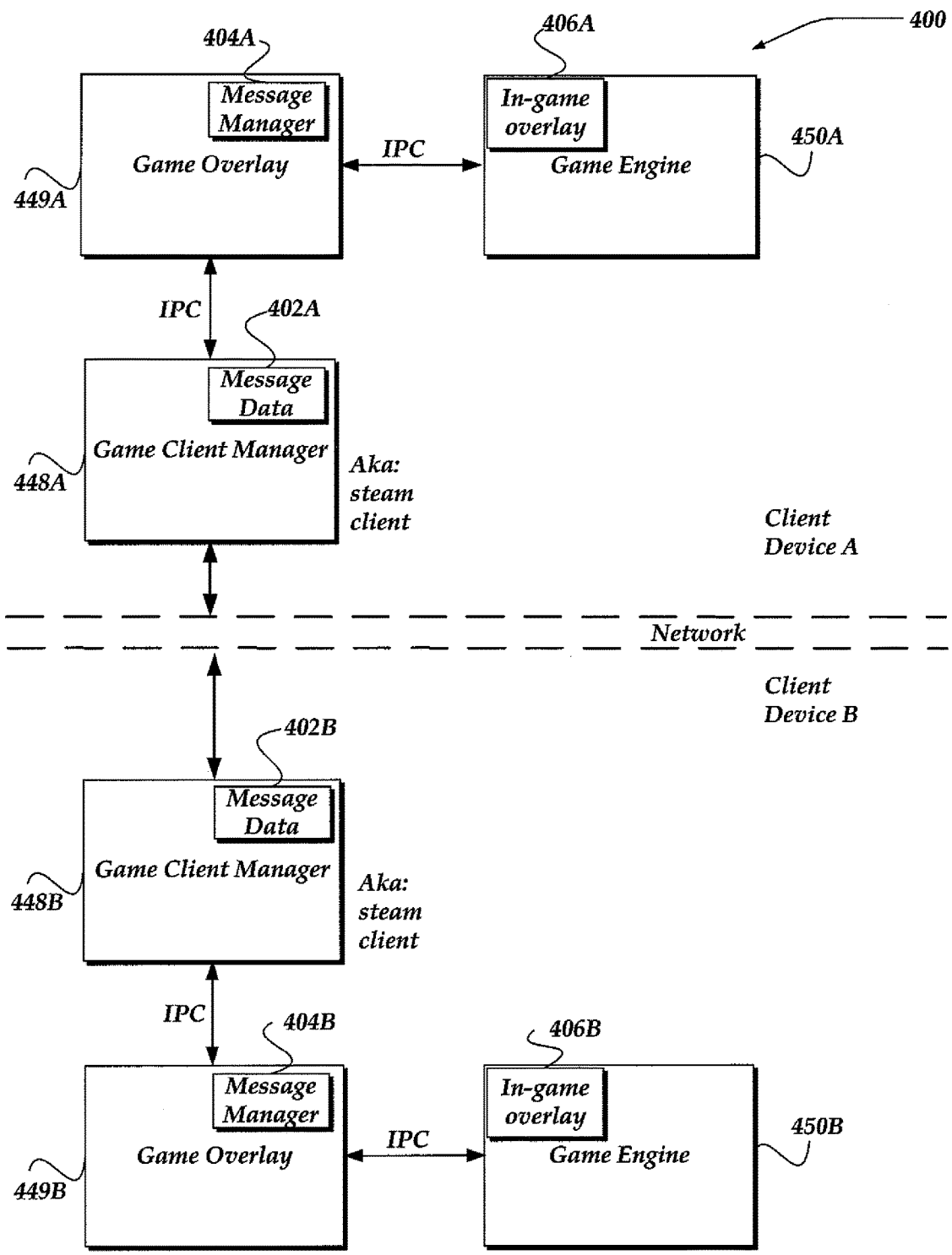
FIG. 4 illustrates another block diagram showing another embodiment of aspects of the environment for practicing the invention.

FIG. 4 illustrates another block diagram showing another embodiment of aspects of the environment for practicing the invention. Architecture 400 may include many more components than those shown. The components shown, however, are sufficient to disclose an illustrative embodiment for practicing the invention.

While architecture 400 illustrates game components, the invention is not so limited. Thus, other interactive applications may also be used, without departing from the scope of the invention. As shown, however, are two client devices A and B, each with various game components. Client devices A and B may represent client devices 101-104 of FIG. 1, for example. Client devices A and B may communicate through one or more networks, such as illustrated in FIG. 1.

As shown, client device A includes game client manager 448A, game overlay 449A, and game engine 450A. Client device B includes similar components, including game client manager 448B, game overlay 449B, and game engine 450B. Such components are substantially similar to game client manager 248, game overlay 249, and game engine 250 described in detail above in conjunction with FIG. 2.

Also shown is that game client managers 448A-B include message data 402A and 402B, respectively, which is useable to receive and store messaging data. Game overlays 449A-B include message manager 404A-B, respectively, which is configured to manage messaging session data. In one embodiment, such messaging data may be passed between game client manager 448 (A or B) and game overlay 449 (A or B) through an IPC, as described above. Moreover, message managers 404A-B may further be configured to manage rendering of the messaging session user interface window overlaid onto a game display.

Also shown are in-game overlays 406A-B within game engines 450A-B, respectively. Such in-game overlays 406A-B represent the hooked components associated with game engines 450A-B, each of which provide jumps to game overlays 449A-B, respectively.

Generalized Operation

Figure 5:
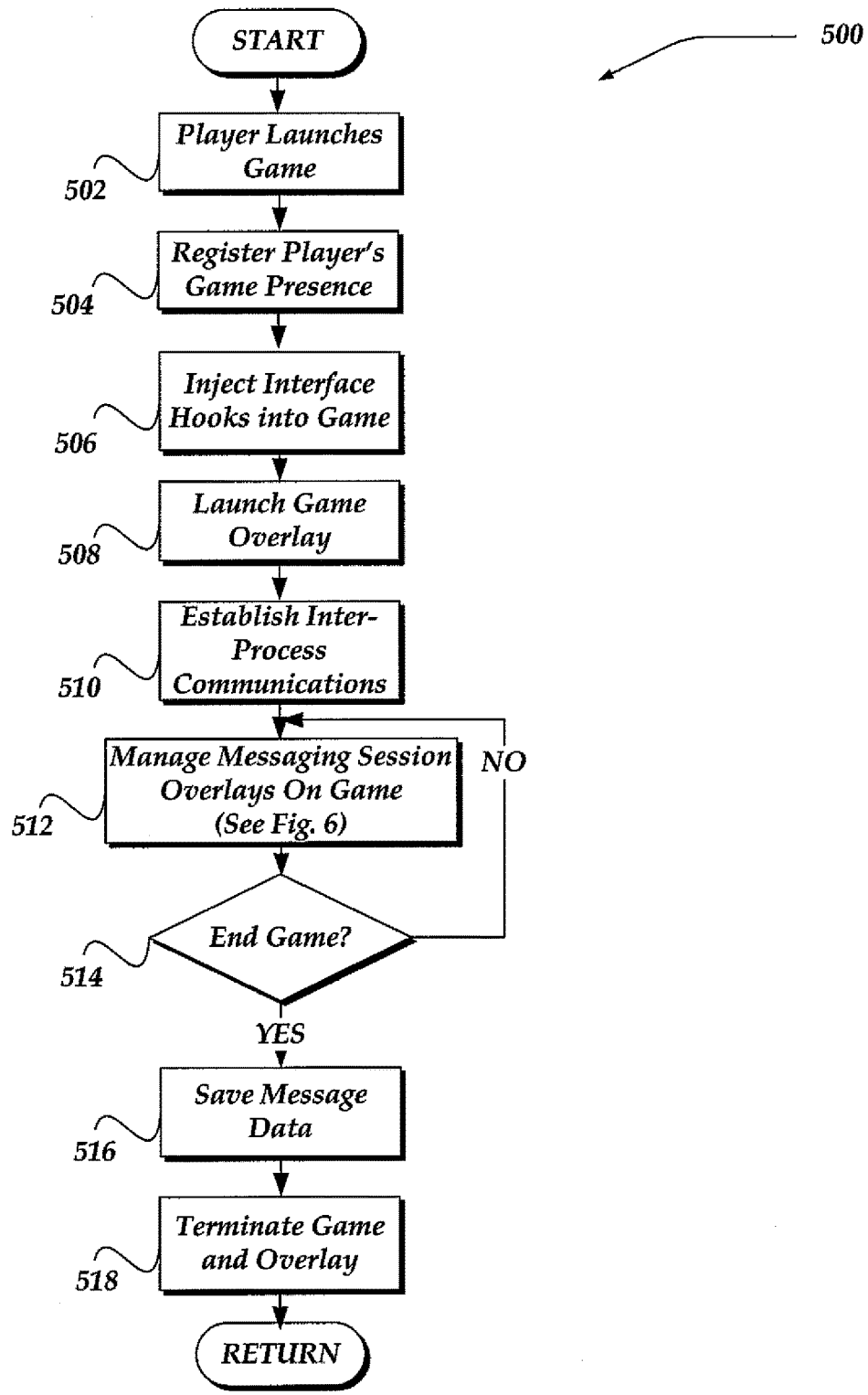
FIG. 5 illustrates a flow chart for one embodiment of a process of managing creation of a game environment with overlays useable to manage a messaging session.

The operation of certain aspects of the invention will now be described with respect to FIGS. 5-6. FIG. 5 illustrates a flow chart for one embodiment of a process of managing creation of a game environment with overlays useable to manage a messaging session. In one embodiment, process 500 of FIG. 5 may be implemented within game client manager 248 of FIG. 2.

Process 500 begins, after a start block, at block 502, where a player's request to launch a game (or other interactive application) is received. In one embodiment, a client game application, such as game engine 250 of FIG. 2 may be launched for execution.

Processing flows next to block 504, where the user may be registered over a network with a network game server, to indicate that the user is 'online' to play the interactive game. In one embodiment, information about who else may be playing interactive games may be received, including, a list of friend's, a status of whether the other user is online, offline, in a game, which game the other user may be playing, and the like.

Processing continues to block 506, while a process of launching the client game engine is being executed, the process may be monitored to identify which input, and/or output libraries, functions, or other components, are to be employed by the client game engine. In one embodiment, the launch and/or execution process may be paused to enable such identified input/output components to be hooked as described above.

Continuing to block 508, a game overly may also be launched for execution. Flowing to block 510, inter-process communications may be established between a game client manager, game overlay, and client game engine, as described above. The IPC (or other mechanism) may then be used to manage a flow of the presence information, messaging data, and/or other information.

Processing then flows to block 512, which is described in more detail below in conjunction with FIG. 6. Briefly, however, at block 512, once the game engine executes, it may provide to a screen display a game display configured to enable display of the game. Moreover, game engine execution may establish various bindings of various inputs to various game functions. For example, the game engine may monitor for selected keystroke combinations, mouse selections, and/or the like, and interpret them as specific actions within the game play.

In any event, at block 512, using the hooked input/output components, the game overlay may monitor various user inputs and/or display outputs and manage the inputs/outputs to enable rendering of a messaging session user interface overlaid onto the game display.

Processing flows to decision block 514, to determine if the game is to be terminated. That is, is each client game engine currently executing on the client device to be terminated? If not, then processing loops back to block 512; otherwise, processing flows to block 516.

At block 516, messaging data may be stored for use in a subsequent messaging session. Processing then flows to block 518, where the client game engine(s) are terminated, along with the messaging session overlay. Processing then returns to a calling process to perform other actions.

Figure 6:
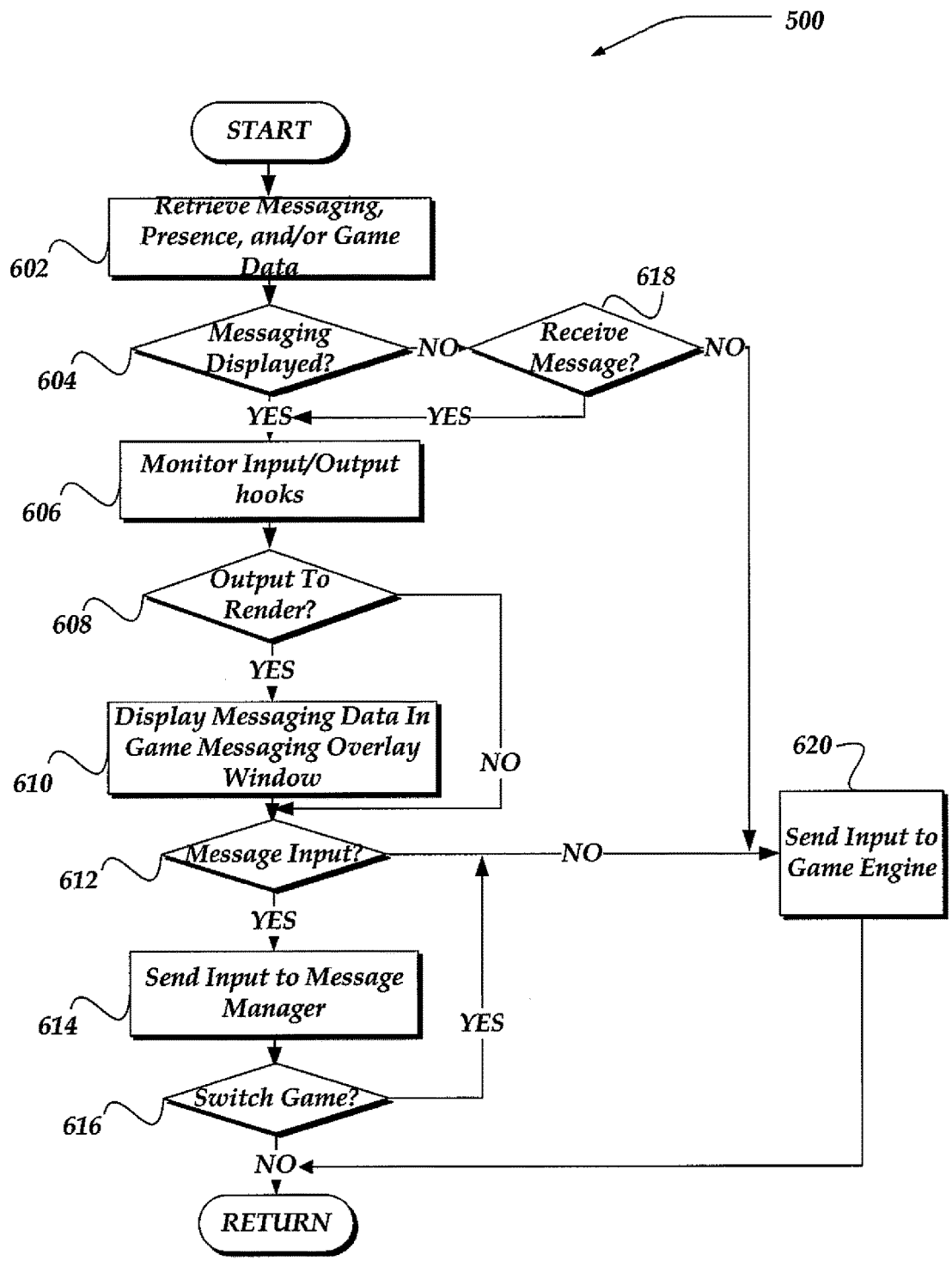
FIG. 6 illustrates a flow chart for one embodiment of a process of managing interactions between a messaging window overlay and a game session.

FIG. 6 illustrates a flow chart for one embodiment of a process of managing interactions between a messaging window overlay and a game session. Process 600 of FIG. 6 represents one embodiment, of block 512 of FIG. 5. Process 600 may be implemented within game overlay 249 of FIG. 2, in one embodiment, Process 600 begins, after a start block, at block 602, where messaging data, including presence information, as well as game data is retrieved over a network. In one embodiment, such data may be retrieved through an IPC, or the like, from another client component that retrieves the data over the network.

Processing continues to decision block 604, where a determination is made whether a messaging session is active and is to be displayed using a user interface window overlaid onto a game display. If so, processing flows to block 606; otherwise processing flows to decision block 618.

At decision block 618, a determination is made whether a message is received from another network device, where the message is to be displayed within a messaging session. Such might arise, where the message is to start a new messaging session, for example. If any event if no message is received, processing flows to block 620; otherwise processing flows to block 606.

At block 606, monitoring of the hooked user input and display output components is performed to detect whether a user input is received, or an output is to be rendered to the user's screen display.

Processing continues to decision block 608, where a determination is made whether a display output is received for rendering. If so, processing flows to block 610, where the output may be modified to enable display of a messaging session user interface overlaid onto the game display. Processing flows next to decision block 612.

At decision block 612, a determination is made whether a message input is received. That is, based on the monitoring, a determination is made whether the user input is associated with the messaging session or the game session. Such determination may be based on a variety of criteria. For example, if the user has moved a mouse managed cursor over a screen area in which the messaging session user interface is displayed, then the user input may be interpreted as being associated with the messaging session. For example, the user may be provided with an ability to change how text input is interpreted from keyboard inputs based on a mouse cursor position. Thus, mousing over the messaging session user interface may indicate that keystroke entries are to be directed to the messaging session. When the mouse cursor is moved outside of the user interface, then it may be determined that keystroke entries are to be directed to the game engine for use in game play.

Similarly, various input device might be configured to be dedicated to game play. Thus, for example, inputs from a joystick might be considered to be directed to the game play, rather than to a messaging session. Similarly, various keyboard keystroke combinations might be interpreted to be associated with the game play, while others might be interpreted to be messaging session related. Audio/video inputs might be considered to be associated with the messaging session, for example. It should be noted, that such relationships are merely examples, and not necessarily restrictive, or exhaustive. Thus, other relationships of user inputs may also be used to determine whether a user input is for the messaging session or the game play. In any event, if the user input is determined to be related to the messaging session processing flows to block 614; otherwise, processing flows to block 620.

At block 614, the user input is sent to be used for the messaging session. Process 600 then flows to decision block 616. At decision block 616, a determination is made whether the user input is associated with a request to switch the game engine to another game engine. Such request might be indicated by a selection of a link within a messaging session user interface, a pre-defined keystroke, or the like. In any event, if a request to switch games is received, processing loops to block 620; otherwise, processing returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Screen Display with Messaging Session User Interface Overlay

Figure 7:
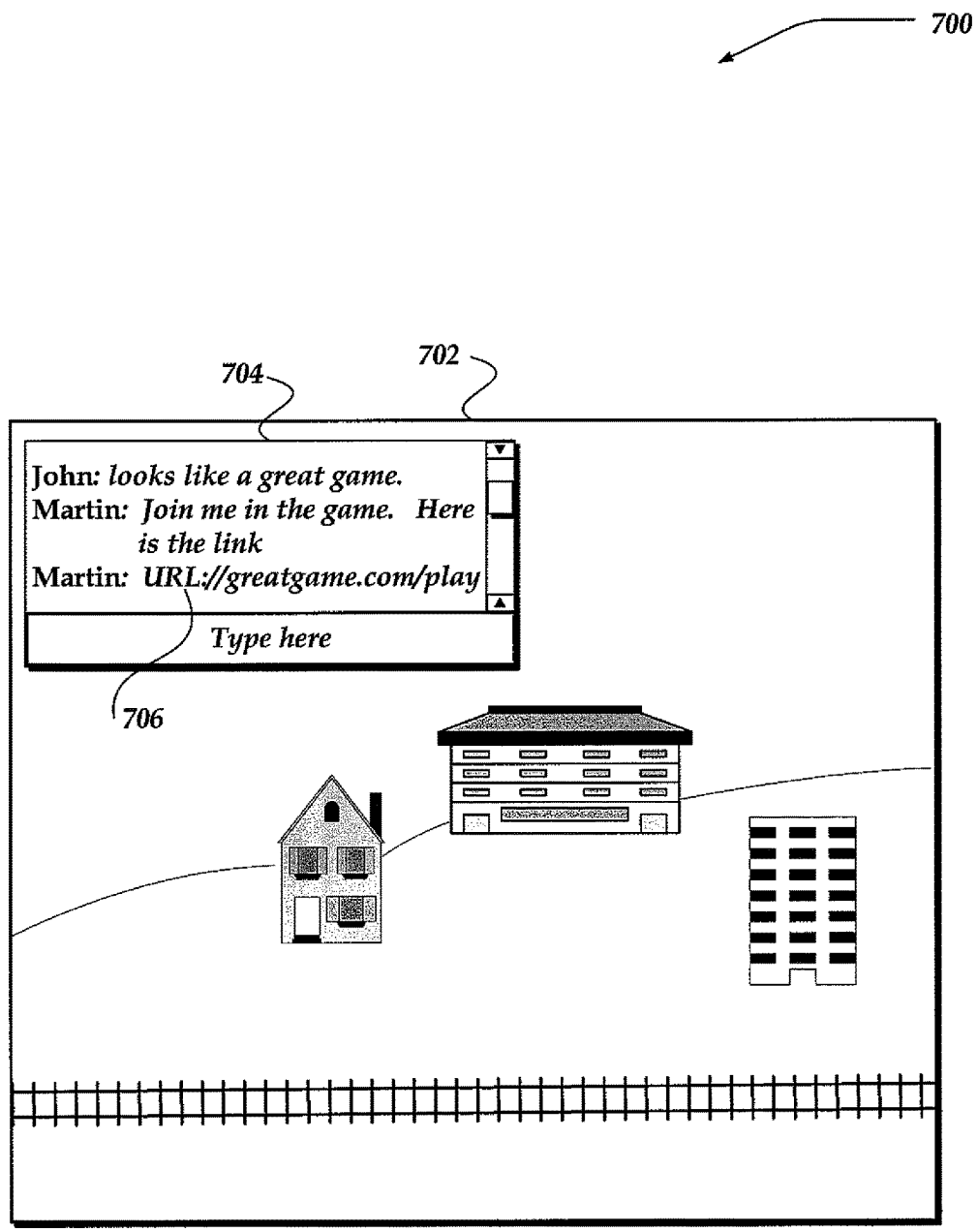
FIG. 7 illustrates one embodiment of a non-exhaustive non-limiting example of a messaging session user interface window overlaid onto a game display.

FIG. 7 illustrates one embodiment ova non-exhaustive non-limiting example of a messaging session user interface window overlaid onto a game display. Screen display 700 may include many more components than those shown. The components shown, however, are sufficient to disclose an illustrative embodiment for practicing the invention. Thus, for example, an operating system toolbar might be included, or the like. Therefore, it should be recognized that screen display 700 is merely provided as one possible embodiment, and the invention is not to be limited or otherwise constrained by this example.

In any event, screen display 700 represents one possible display of content that might be displayable during execution of an interactive computer game. Thus, screen display 700 includes a game display 702 and a messaging session user interface 704. While a single messaging session user interface 704 is illustrated, the invention is not so limited. Thus, in one embodiment, a plurality of messaging session user interfaces similar to messaging session user interface 704 may be employed. Such plurality may be layered, and/or placed in various locations overlaid onto game display 702. Moreover, while messaging session user interface 704 is shown in an upper leftmost corner of game display 702, the invention is not so constrained, and messaging session user interface 704 may be located in virtually any location overlaid onto game display 702. Moreover, a user may relocate messaging session user interface 704 using any of a variety of mechanisms, including, for example, using a drag mechanism, using an option selector bar, or the like.

Also illustrated is a non-limiting example of a link 706 within messaging session user interface 704 that may be selected to request a switching of game plays. As noted above, other mechanisms may also be employed.

Thus, as shown, unlike traditional mechanisms whereby a user might have to attempt to transition from a full-screen mode to a desktop mode for the game display 702, to manage a messaging session, the present session overlays the messaging session for ease of access. It is noted that many of the traditional interactive games are configured to 'assume control' of an entire screen display 700, and/or user inputs, thereby inhibiting such concurrent display and interaction of game play with a messaging session.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A client device that is configured for use in playing a computer game, comprising:
  a processor; and memory in communication with the processor useable in storing data and machine instructions that causes the processor to perform actions, including:

launching the computer game for execution;

pausing the launch of the computer game;

injecting hooks into a portion of a component used by the computer game on the client device while the launch is paused, wherein injecting the hooks includes modifying at least one input or output function of the computer game by inserting code that is configured to perform a jump to a game overlay component, wherein injecting the hooks further comprises modifying at least one input or output function with a jump to the game overlay component, wherein the game overlay component is configured to determine if the monitored input or output is to be directed to a messaging session;

resuming the launch such that the computer game executes on the client device;

executing the computer game including the hooked component;

employing the hooks to monitor for a user input or a display output;

determining if a monitored user input is associated with the messaging session, and if so: directing the user input to the messaging session;

if the output is associated with a display output, employing the output to display, at least in part, a user interface window for the messaging session overlaid onto a game display managed through the computer game;

detecting a user selection within the messaging session indicating a request to join a second computer game that is different from the first computer game; and enabling the second computer game to be launched on the client device, with an other messaging session, such that the client device plays both computer games with messaging sessions overlaid thereon.

2. The client device of claim 1, wherein the data and machine instructions that causes the processor to perform actions, further including:

receiving over a network from a remote network device presence information that includes at least one of a name of another game user, or an online status of another game user; and providing the presence information to a game overlay component such that at least some of the presence information is accessible through the overlaid messaging session user interface window.

3. The client device of claim 1, wherein determining if the monitored input is associated with the messaging session further comprises:

detecting that the messaging session is active: and if so, then:

if the input is a pre-defined keystroke combination associated with play of the computer game, then determining that input is associated with the messaging session;

if a mouse input cursor is detected as within a pre-defined user interface window associated with the messaging session, then determining that a keyboard input is associated with the messaging session; and modifying a display output to enable display of the user interface window for the messaging session overlaid on the game display.

4. The client device of claim 1, wherein injecting hooks further comprises:

executing the game overlay component, such that the game overlay component establishes an inter-process communications (IPC) between a game client component and the computer game; and employing the IPC to transfer messaging data between the client device, messaging session, and the game client component for use in communicating with another messaging session on another client device.

5. A system that is configured for use in managing a computer game, comprising:

a game client manager that is configured to perform actions, including:

receiving a request to play the computer game;

launching for play the requested computer game;

pausing the launch of the computer game;

injecting hooks into components employed by the computer game while the launch is paused, wherein injecting the hooks includes modifying at least one input or output function of the computer game by inserting code that is configured to perform a jump to a game overlay component, wherein injecting the hooks further comprises modifying at least one input or output function with a jump to the game overlay component, wherein the game overlay component is configured to determine if the monitored input or output is to be directed to a messaging session;

resuming the launch such that the computer game executes on the client device;

launching the game overlay component;

receiving messaging session data; and providing the messaging session data to the game overlay component for use in the messaging session during play of the computer game; and the game overlay component that is configured to perform actions, including:

employing the hooks to monitor for a user input or a display output;

if a user input is detected, determining if the user input is associated with the computer game or the messaging session, and routing the user input to the computer game or the messaging session based on the determination;

if the display output is detected, modifying the display output to enable display of a user interface window for the messaging session that is overlaid onto a game display associated with the computer game;

detecting a user selection within the messaging session indicating a request to join a second computer game, the first computer game and the second computer game not being the same computer game; and enabling the second computer game to be launched on the client device, with an other messaging session, such that the client device plays both computer games with messaging sessions overlaid thereon.

6. The system of claim 5, wherein the game overlay component that is configured to perform actions, including:

employing the hooks to monitor for another output;

if the other output is determined to be associated with the messaging session, sending the other output to the messaging session; and if the other output is determined to be unassociated with the messaging sessions, sending the other output to the computer game.

7. The system of claim 5, wherein if the user input includes a pre-defined keyboard input associated with the computer game, then determining that the user input is to be routed to the game.

8. The system of claim 5, wherein detecting if a mouse curser is within the user interface window of the messaging session, then determining that a user input associated with a keyboard entry is to be routed to the messaging session.

9. The system of claim 5, wherein the game overlay component that is configured to perform actions, including:
enabling the other second computer game to be launched, while maintaining the messaging session as active during the launching of the second computer game.

10. The system of claim 5, wherein the game client manager is further configured to maintain and store messaging session state information.

11. The system of claim 5, wherein the game overlay component is configured to communicate the messaging session data between the computer game and the game client manager.

12. A method of managing a computer game, comprising:
launching the computer game for execution;
pausing the launch of the computer game;
injecting hooks into a portion of a computer game component while the launch is paused, wherein injecting the hooks includes modifying at least one input or output function of the computer game by inserting code that is configured to perform a jump to a game overlay component, wherein injecting the hooks further comprises modifying at least one input or output function with a jump to the game overlay component, wherein the game overlay component is configured to determine if the monitored input or output is to be directed to a messaging session;
resuming the launch such that the computer game executes on the client device;
executing the computer game including the hooked computer game component;
executing the game overlay component configured to establish the messaging session user interface window overlaid onto a game display that is managed through the computer game;
employing the hooks to monitor user inputs and display outputs;
if a monitored input or output is associated with the messaging session, directing the input to the messaging session or employing the output to display, at least in part, the user interface for the messaging session overlaid onto the game display;
detecting a user selection within the messaging session indicating a request to join a second computer game that is not the same as the first computer game; and
enabling the second computer game to be launched on the client device, with an other messaging session, such that the client device plays both computer games with messaging sessions overlaid thereon.

13. The method of claim 12, wherein monitoring the input and outputs further comprises enabling at least one user input to be provided to the computer game, while another user input is provided to the messaging session based on a source of the user input.

14. The method of claim 12, wherein the messaging session is preserved across computer games.

15. The method of claim 12, further comprising:
executing a game client manager, wherein the game client manager performs actions, comprising:
receiving messaging data over a network from a different network device than the game client manager;
distributing the message data to the game overlay component for use in the messaging session; and
storing the messaging data such that the messaging data is accessible to the messaging session during transition between the computer game and another computer game.

16. The method of claim 12, wherein the display output is employed in part to modify a rendering of a display such that the messaging session is displayed overlaid onto the game display.

17. The method of claim 12, wherein the game overlay component is configured to communicate with the computer game through an inter-process communications.

18. The method of claim 12, wherein mousing over the user interface window for the messaging session represents an input indicating that a keyboard entry is associated with the messaging session.

* * * * *